United States Patent [19]
Takahashi et al.

[11] Patent Number: 5,383,364
[45] Date of Patent: Jan. 24, 1995

[54] THREE-AXIS ACCELERATION SENSOR VARIABLE IN CAPACITANCE UNDER APPLICATION OF ACCELERATION

[75] Inventors: Masaji Takahashi; Yuji Kondo, both of Tokyo, Japan

[73] Assignee: NEC Corporation, Tokyo, Japan

[21] Appl. No.: 972,537

[22] Filed: Nov. 6, 1992

[30] Foreign Application Priority Data

Nov. 21, 1991 [JP] Japan .................. 3-305176

[51] Int. Cl.⁶ .......................................... G01P 15/125
[52] U.S. Cl. ........................... 73/517 R; 361/280
[58] Field of Search .......... 73/517 R, 517 AV, 517 B; 361/280

[56] References Cited

U.S. PATENT DOCUMENTS

| | | | |
|---|---|---|---|
| 4,345,474 | 8/1982 | Deval | 73/517 B |
| 4,483,194 | 11/1984 | Rudolf | 73/517 R |
| 4,736,629 | 4/1988 | Cole | 73/517 R |
| 5,095,752 | 3/1992 | Suzuki et al. | 73/517 B |
| 5,134,881 | 8/1992 | Henrion et al. | 73/517 R |
| 5,243,861 | 9/1993 | Kloeck et al. | 73/517 R |

*Primary Examiner*—Tom Noland
*Assistant Examiner*—Helen C. Kwok
*Attorney, Agent, or Firm*—Sughrue, Mion, Zinn, Macpeak & Seas

[57] ABSTRACT

An acceleration sensor comprises an upper semiconductor substrate having a rigid frame, four deformable beams connected with the rigid frame, and a weight portion supported by the plurality of deformable beams, a lower semiconductor substrate bonded to the rigid frame, a plurality of movable electrodes attached to the weight portion, and electrically isolated from one another, and a plurality of stationary electrodes attached to the second semiconductor substrate, and opposite to the plurality of movable electrodes for forming a plurality of variable capacitors, and the center of gravity of the weight portion is spaced from a common neutral surface of the four beams for allowing acceleration to produce bending moment exerted on the four beams, thereby causing the variable capacitors to independently change the capacitance.

8 Claims, 4 Drawing Sheets

THREE-AXIS ACCELERATION SENSOR VARIABLE IN CAPACITANCE UNDER APPLICATION OF ACCELERATION

FIELD OF THE INVENTION

This invention relates to a three-axis acceleration sensor and, more particularly, to a three-axis acceleration sensor of the type using variable capacitors formed in substrates.

DESCRIPTION OF THE RELATED ART

The three-axis acceleration sensor finds a wide variety of application such as, for example, cars, aircraft, boats, robots, industrial equipments and measuring instruments. The three-axis acceleration sensor is expected to detect three components in the orthogonal axes, and a typical example of the three-axis acceleration sensor is equipped with strain gauges attached to cantilever plates. When acceleration is exerted on the cantilever plates, the cantilever plates are deformed, and the strain gauges convert the deformations into electric signals respectively indicative of the components of the acceleration.

Another prior art acceleration sensor is fabricated on a silicon substrate, and the semiconductor acceleration sensors are disclosed in Japanese Patent Application laid-open Nos. 63-266358 and 63-266329. The semiconductor acceleration sensor has a weight and a beam formed through etching process, and dopant impurities are diffused into the beam so that a piezoelectric resistor is formed therein. When acceleration is exerted on the weight, the beam and, accordingly, the piezoelectric resistor are deformed. As a result, the piezoelectric resistor varies the resistance, and a component of the acceleration is taken out as a voltage signal.

However, the prior art three-axis acceleration sensor using the strain gauges has a problem in complex structure because of the three cantilever plates and the strain gauges attached thereto, and is hardly miniaturized. The semiconductor acceleration sensor is desirable in view of miniaturization. However, the resistivity of the piezoelectric resistor is variable with temperature, and the value measured by the semiconductor acceleration sensor is less reliable. If a compensating circuit is coupled with the semiconductor acceleration sensor, the variation of the resistivity is compensated, and the compensation circuit enhances the reliability of the measured value. However, the compensating circuit is complex and expensive, and the total acceleration sensor system is not so attractive.

SUMMARY OF THE INVENTION

It is therefore an important object of the present invention to provide a three-axis acceleration sensor which is simple in structure and small in temperature dependency.

To accomplish the object, the present invention proposes to exert acceleration on a weight for changing relative relation between movable electrodes and stationary electrodes, thereby changing capacitances of variable capacitors.

In accordance with the present invention, there is provided an acceleration sensor comprising: a) a first semiconductor substrate having a rigid frame, a plurality of deformable beams connected with the rigid frame, and a weight portion supported by the plurality of deformable beams and having the center of gravity spaced from neutral surfaces of the plurality of deformable beams; b) a second semiconductor substrate bonded to the rigid frame, and substantially rigid in comparison with the plurality of deformable beams; c) a plurality of movable electrodes attached to the weight portion; and d) a plurality of first stationary electrodes attached to the second semiconductor substrate, and opposite to the plurality of movable electrodes for forming a plurality of variable capacitors, the capacitances of the plurality of variable capacitors being independently measurable.

BRIEF DESCRIPTION OF THE DRAWINGS

The features and advantages of the semiconductor three-axis acceleration sensor according to the present invention will be more clearly understood from the following description taken in conjunction with the accompanying drawings in which.

DESCRIPTION OF THE PREFERRED EMBODIMENTS

First Embodiment

Figure 1:
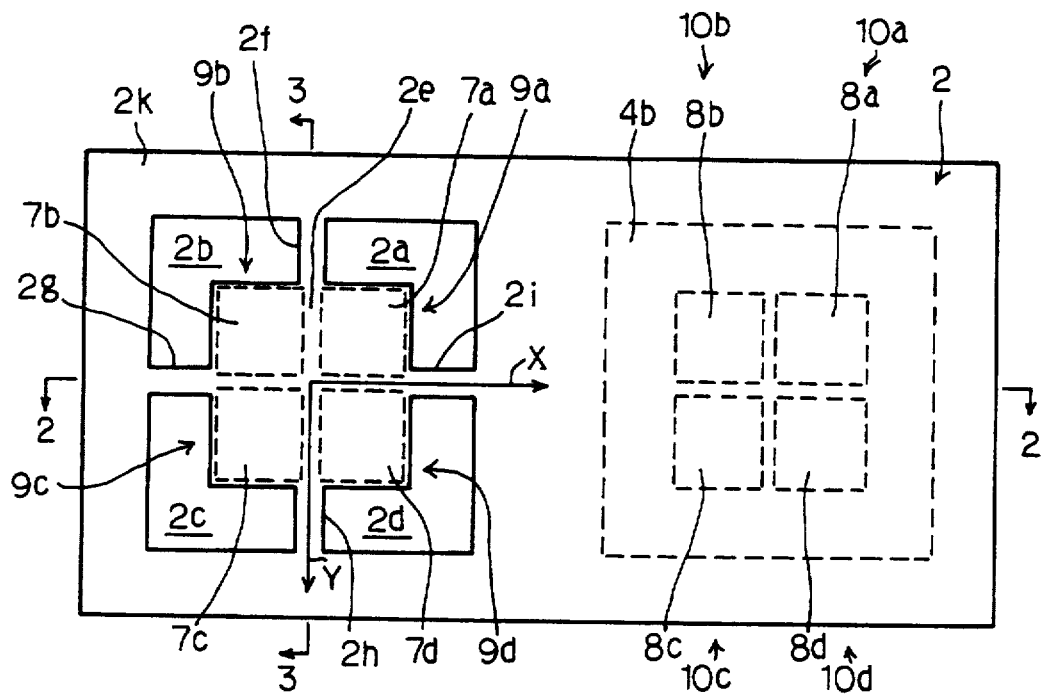
FIG. 1 is a plan view showing the arrangement of a three-axis acceleration sensor according to the present invention.
Figure 2:
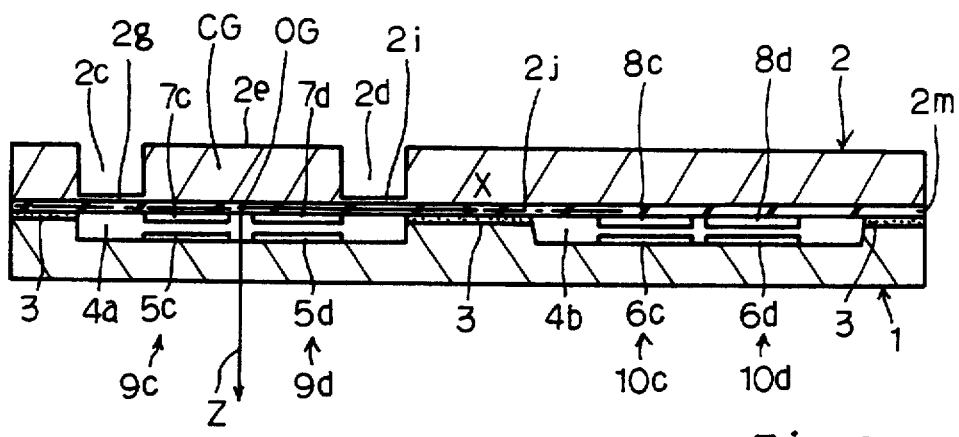
FIG. 2 is a cross sectional view taken along line A—A of FIG. 1 and showing the structure of the three-axis acceleration sensor.

Referring first to FIGS. 1 and 2 of the drawings, a three-axis acceleration sensor embodying the present invention is fabricated on lower and upper silicon substrates 1 and 2 bonded to each other by using adhesive films 3. The lower silicon substrate 1 is partially etched away so that rectangular hollow spaces 4a and 4b are formed between the lower and upper silicon substrates 1 and 2. Four stationary electrodes 5a, 5b, 5c and 5d are provided on the lower silicon substrate 1, and are exposed to the rectangular hollow space 4a. Furthermore, four stationary electrodes 6a, 6b, 6c and 6d are formed on the lower silicon substrate 1 in such a manner as to be exposed to the rectangular hollow space 4b.

Angle shaped moats 2a, 2b, 2c and 2d are formed in the upper surface portion of the upper silicon substrate 2 through the etching process, and define a weight 2e supported by four beams 2f, 2g, 2h and 2i. The weight is shaped into a hexahedron, and the upper and lower surfaces are generally rectangular. The center of gravity of the weight 2e is labeled with CG in FIG. 2, and one of the orthogonal three axes Z virtually passes through the center of gravity CG, and the other axes are assumed to be on the common neutral surface 2j of the beams 2f to 2e. The center of gravity CG is spaced apart from the origin OG of the coordinate axes X, Y and Z and, accordingly, from the neutral surface 2j, and bending moment is exerted on every beam 2f to 2i when acceleration is applied to the weight 2e. The remaining portion outside the moats 2a to 2d serves as a rigid frame 2k, and the weight 2e is coupled through the beams 2f to 2i with the rigid frame 2k.

The lower surface portion of the upper silicon substrate 2 is oxidized, and a silicon oxide film 2m covers the lower surface of the upper silicon substrate 2. However, the silicon oxide film may be deposited over the lower surface of the upper silicon substrate 2, and other insulating substance is available. Four movable electrodes 7a, 7b, 7c and 7d are attached to the silicon oxide film 2m on the lower surface of the weight 2e in opposing relation to the stationary electrodes 5a to 5d. As will be better seen from FIG. 1, the movable electrodes 7a to 7d are arranged in such a manner as to be in the first to fourth quadrants of the X-Y coordinate system. Furthermore, stationary electrodes 8a, 8b, 8c and 8d are attached to the silicon oxide film 2m on the lower surface of the rigid frame 2k in such a manner as to be in opposing relation to the stationary electrodes 6a to 6d, and the movable electrodes 7a to 7d and the stationary electrodes 8a to 8d are identical in geometry as well as in dimensions with one another. The stationary electrodes 5a to 5d are spaced from the movable electrodes 7a to 7d in the direction of Z axis, and the stationary electrodes 5a to 5d and the movable electrodes 7a to 7d form in combination variable capacitors 9a, 9b, 9c and 9d electrically isolated from one another. Similarly, the stationary electrodes 8a to 8d are spaced apart from the stationary electrodes 6a to 6d, and the stationary electrodes 8a to 8d and the associated stationary electrodes 6a to 6d form in combination fixed capacitors 10a, 10b, 10d and 10d also electrically isolated from one another. While any acceleration is not exerted on the weight 2e, each of the variable and fixed capacitors 9a to 9d and 10a to 10d has "standard capacitance CO". When bending moment deforms the beams 2f to 2i, the capacitance of each variable capacitor 9a to 9d is varied as described hereinbelow. However, the each fixed capacitor 10a to 10d maintains the capacitance thereof even if acceleration causes the weight 2e to deform the beams 2f to 2e.

Figure 3A:
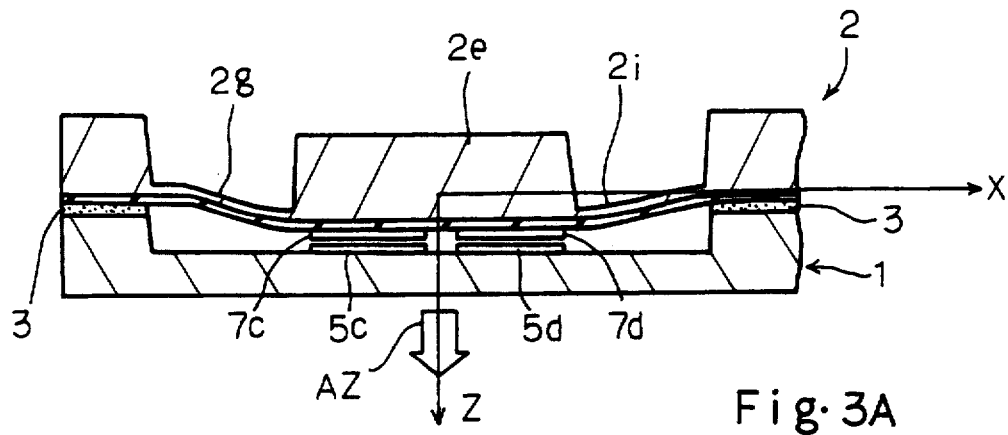
FIG. 3A is a cross sectional view taken along line A—A and showing deformation of beams of the three-axis acceleration sensor when acceleration is exerted on a weight in the direction of Z axis.

Description is hereinbelow made on principle of detecting components of acceleration with reference to FIGS. 3A to 3C. First, if acceleration AZ is exerted on the weight 2e in the direction of Z axis only as shown in FIG. 3A, the weight 2e downwardly moves, and the movable electrodes 7a to 7d become closer to the associated stationary electrodes 5a to 5d, and all of the variable capacitors 9a to 9d increase the capacitances thereof from the standard capacitance CO.

Figure 3B:
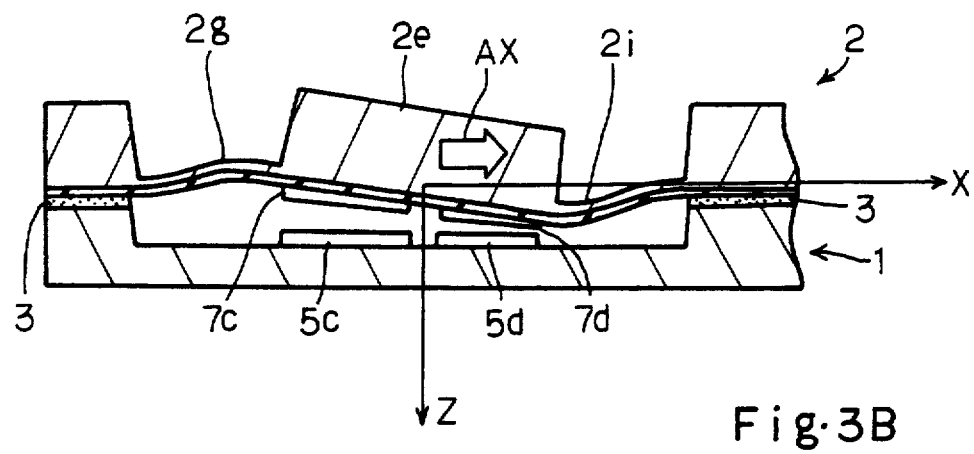
FIG. 3B is a cross sectional view taken along line A—A and showing deformation of the beams when acceleration is exerted on the weight in the direction of X axis.
Figure 3C:
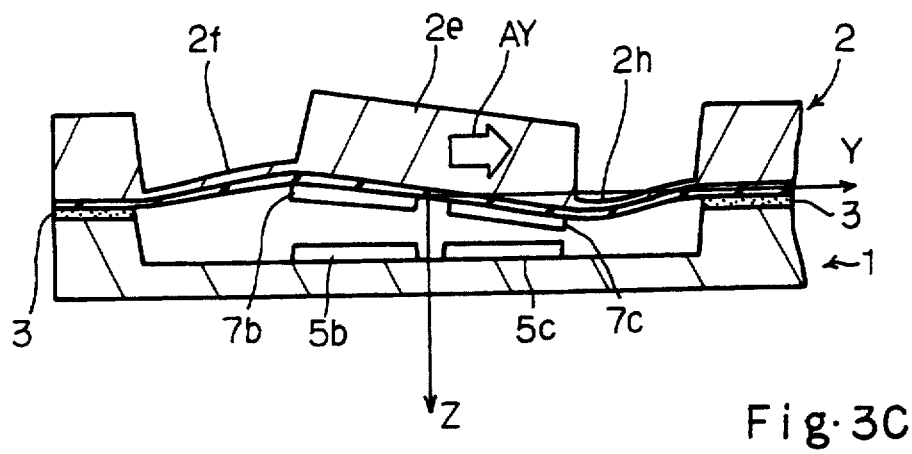
FIG. 3C is a cross sectional view taken along line B—B and showing deformation of the beams when acceleration is exerted on the weight in the direction of Y axis.

When acceleration AX is exerted on the weight in the direction of X axis as shown in FIG. 3B, the weight 2e rotates in the clockwise direction on the virtual plane defined by X and Z axes, and bending moment deforms the beams 2g and 2e. The movable electrodes 7b and 7c increase the gaps from the associated stationary electrodes 5b and 5c, and the other movable electrodes 7a and 7d become closer to the associated stationary electrodes 5a and 5d. As a result, the variable capacitors 9b and 9c decrease the capacitances from the standard capacitance CO, and the other variable capacitors 9a and 9d increase the capacitances CO from the standard capacitance VO.

Finally, if acceleration AY is exerted on the weight 2e in the direction of Y axis, the weight 2e rotates in the clockwise direction on the virtual plane defined by Y and Z axes, and the movable electrodes 7a and 7b become more distant from the associated stationary electrodes 5a and 5b. However, the other movable electrodes 7c and 7d become closer to the associated stationary electrodes 5c and 5d. As a result, the variable capacitors 9c and 9d increase the capacitances thereof, and the other variable capacitors 9a and 9b decrease the capacitances thereof.

Thus, the variable capacitors 9a to 9d selectively increase and/or decrease the capacitances depending upon the direction of the component, and the variation of the capacitances depend on the magnitude of acceleration. Table 1 summarizes the relation between the direction and the variation of capacitance.

TABLE 1

| Component | Variable Capacitor | | | |
|---|---|---|---|---|
| | 9d (C1) | 9a (C2) | 9b (C3) | 9c (C4) |
| AX | + | + | − | − |
| AY | + | − | − | + |
| AZ | + | + | + | + |

In Table 1, the positive sign and the negative sign are respectively indicative of increase and decrease in capacitance, and C1, C2, C3 and C4 respectively stand for the capacitances of the variable capacitors 9d, 9a, 9b and 9c.

Figure 4:
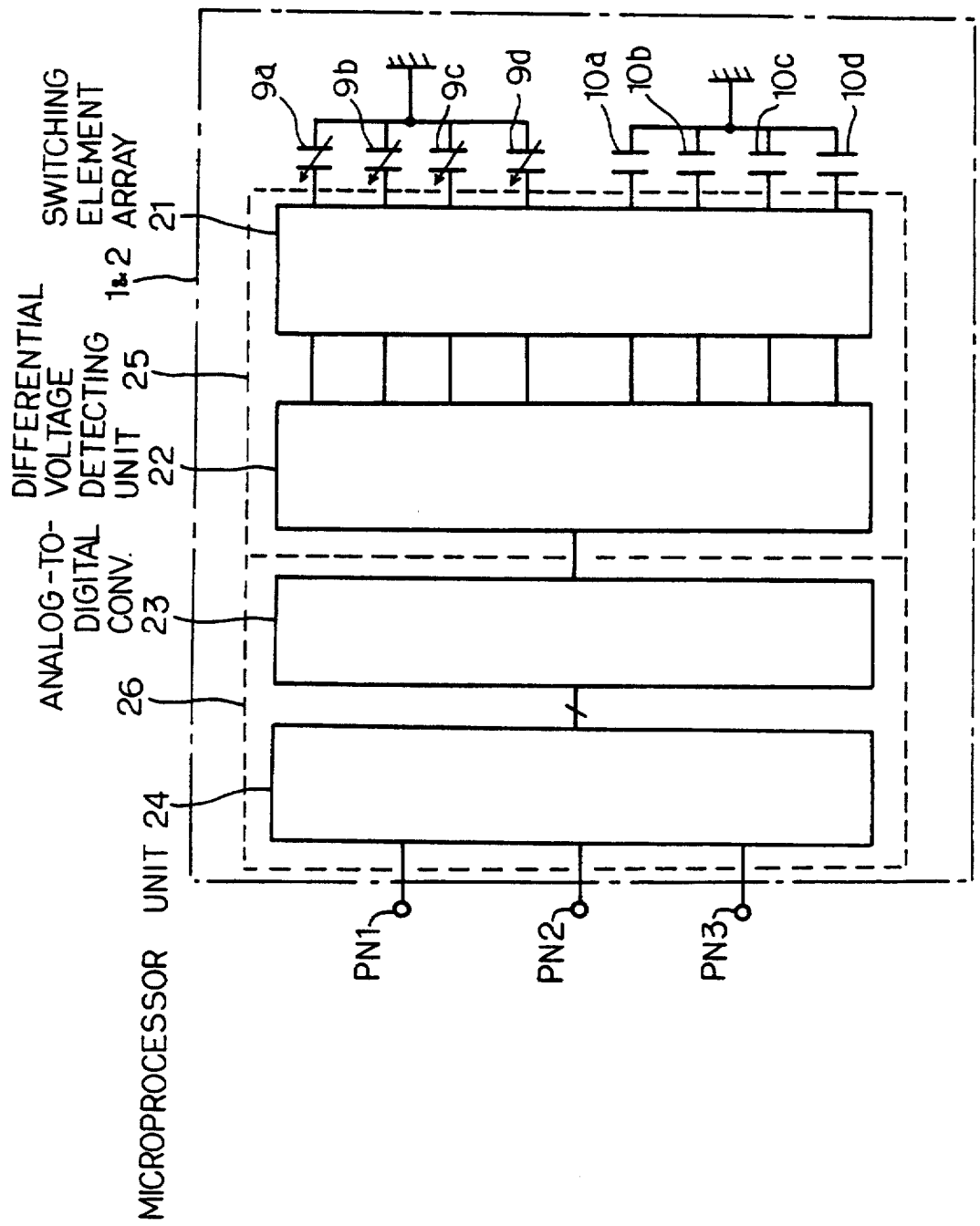
FIG. 4 is a block diagram showing a differential voltage detecting circuit and a calculation unit associated with the acceleration sensor.

As shown in FIG. 4, the variable capacitors 9a to 9d and the fixed capacitors 10a to 10d are coupled with a switching element array 21, and the switching elements are selectively shifted between on-state and off-state for a switched capacitor array so that a differential voltage detecting unit 22 determines differential voltage on the basis of difference between each capacitance C1, C2, C3 or C4 and the standard capacitance CO of the associated fixed capacitor 10d, 10a, 10b and 10c. Each of the differential voltages is supplied to an analog-to-digital converter 23, and the analog-to-digital converter 23 produces digital signals respectively indicative of the differential voltages. The digital signals are supplied to a microprocessor unit 24, and the microprocessor unit 24 determines the orthogonal components of acceleration in the directions of X, Y and Z axes through the following calculation.

Namely, acceleration exerted on the weight 2e is usually broken down into a first component in the direction of X axis, a second component in the direction of Y axis and a third component in the direction of z axis. Every component causes the variable capacitors 9a to 9d to vary the capacitances C1 to C4 as described in Table 1, and each differential voltage contains parts of the three orthogonal components. Therefore, the first to third components are calculated through adding or subtraction as shown in Table 2 where V1, V2, V3 and V4 are indicative of the differential voltages produced from the capacitances C1 to C4.

The first to third components thus calculated are represented by three output data signals OUT1, OUT2 and OUT3, and the three output data signals OUT1 to OUT3 are supplied from the microprocessor unit 24 to three output data pins PN1, PN2 and PN3, respectively.

TABLE 2

| Direction of Component | Calculation |
| --- | --- |
| AX | V1 − V3 |
| AY | V4 − V2 |
| AZ | V2 + V3 |

In this instance, the switching element array 21 and the differential voltage detecting unit 22 as a whole constitute a differential voltage signal producing means 25, and the analog-to-digital converter 23 and the microprocessor unit 24 form in combination a calculating means 26. The differential voltage signal producing means 25 and the component calculating means 26 are integrated on the lower and upper silicon substrates 1 and 2 together with the variable and fixed capacitors 9a to 9d and 10a to 10d.

As will be understood from the foregoing description, the four variable capacitors 9a to 9d accompanied with the single weight 2e allow the differential voltage signal producing means 25 and the component calculating means 26 to break down acceleration into the three orthogonal components, and the variable capacitors 9a to 9d are less affected by temperature. Moreover, the variable and fixed capacitors 9a to 9d and 10a to 10d are miniaturized through semiconductor technologies, and a miniaturized and reliable three-axes acceleration sensor is realized in accordance with the present invention.

Second Embodiment

Figure 5:
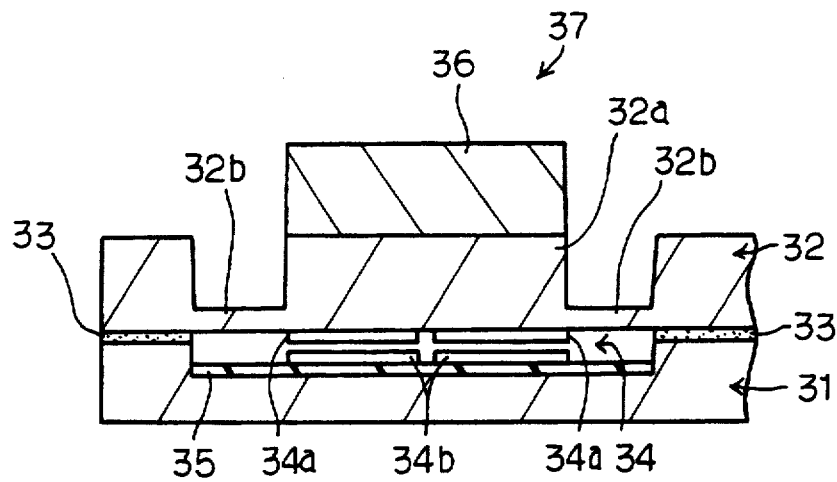
FIG. 5 is a cross sectional view showing a part of another three-axis acceleration sensor according to the present invention.

Turning to FIG. 5 of the drawings, an essential part of another acceleration sensor embodying the present invention is fabricated on lower and upper semiconductor substrate 31 and 32 bonded to each other by using adhesive films 33. FIG. 5 only shows four variable capacitors 34 associated with a weight portion 32a supported by four beam portions 32b. Though not shown in the drawings, the variable capacitors 34 are associated with four fixed capacitors as similar to the first embodiment.

The four variable capacitors are implemented by four movable electrodes 34a and four stationary electrodes 34b, and the movable electrodes 34a are slightly spaced from the four stationary electrodes 34b, respectively. In this instance, the stationary electrodes 34b are provided on an insulating film 35, and are electrically isolated from one another.

The acceleration sensor implementing the second embodiment further comprises an additional weight 36 stacked on the weight portion 32a, and the weight portion 32a and the additional weight 36 as a whole constitute a weight 37. The additional weight 36 causes the center of gravity of the weight 37 to be upwardly moved from the center of gravity of the weight portion 32a, and allows larger moment to be exerted on the beam portions 32b. In other words, the additional weight 36 increases the weight as well as the distance between the neutral surface and the center of gravity, and force produced from acceleration produces larger moment. With the large moment, the beam portions 32b are widely deformed, and the variable capacitors 34 also widely vary the capacitances thereof. This results in high sensitivity of the acceleration sensor.

Third Embodiment

Figure 6:
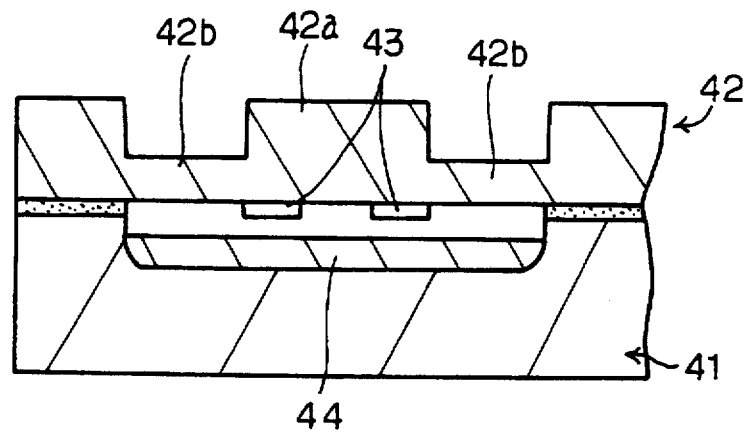
FIG. 6 is a cross sectional view showing the structure of yet another acceleration sensor according to the present invention.

Turning to FIG. 6 of the drawings, an essential part of yet another acceleration sensor is fabricated on lower and upper semiconductor substrates 41 and 42, and fixed capacitors are deleted from FIG. 6. Variable capacitors comprises movable electrodes 43 and a common counter electrode 44, and the common counter electrode 44 is implemented by an impurity region opposite in conductivity type to the lower semiconductor substrate 41. A weight portion and deformable beam portions are labeled with 42a and 42b.

Although particular embodiments of the present invention have been shown and described, it will be obvious to those skilled in the art that various changes and modifications may be made without departing from the spirit and scope of the present invention. For example, the movable electrodes 7a to 7d and the stationary electrodes 8a to 8d may be implemented by respective impurity regions forming p-n junctions with the upper semiconductor substrate 2, and the movable electrodes 43 may be merged instead of the common stationary electrode 44. Moreover, the differential voltage signal producing means 25 and the component calculating means may be separated from the variable capacitors 9a to 9d and the fixed capacitors 10a to 10d.

What is claimed is:

1. An acceleration sensor comprising:
   a) a first semiconductor substrate having a rigid frame, a plurality of deformable beams connected with said rigid frame, and a weight portion supported by said plurality of deformable beams and having the center of gravity spaced from neutral planes of said plurality of deformable beams, the neutral plane being free from an extension and a shrinkage under a bending moment exerted on the deformable beam, wherein the bending moment is created by an acceleration being exerted on said weight portion resulting in the selective deformation of said plurality of deformable beams;
   b) a second semiconductor substrate bonded to said rigid frame, and substantially more rigid than said plurality of deformable beams;
   c) a plurality of movable electrodes attached to said weight portion; and
   d) a plurality of first stationary electrodes attached to said second semiconductor substrate, and opposite to said plurality of movable electrodes for forming a plurality of variable capacitors, the capacitances of said plurality of variable capacitors being independently measurable for determining the magnitudes of components of said acceleration.

2. An acceleration sensor as set forth in claim 1, in which said acceleration sensor is associated with an orthogonal coordinate system having first and second axes on each of said neutral planes and a third axis passing through said center of gravity, said plurality of movable electrodes being located in the first to fourth quadrants defined by said first and second axes.

3. An acceleration sensor as set forth in claim 1, in which further comprising: e) a plurality of second stationary electrodes attached to said second semiconductor substrate; and f) a plurality of third stationary electrodes attached to said rigid frame in opposing relation to said plurality of second stationary electrodes for forming a plurality of fixed capacitors, said plurality of variable capacitors and said plurality of fixed capacitors being equal in capacitance while no acceleration is exerted on said weight portion.

4. An acceleration sensor as set forth in claim 2, in which said plurality of deformable beams inwardly project from said rigid frame for supporting said weight portion inside said rigid frame.

5. An acceleration sensor as set forth in claim 4, in which said plurality of deformable beams consists of first and second beams substantially aligned with said first axis, and third and fourth beams substantially aligned with said second axis.

6. An acceleration sensor as set forth in claim 3, in which a differential voltage producing means and a calculating means are associated with said acceleration sensor, said differential voltage, producing means being coupled with said variable capacitors and said fixed capacitors for producing differential voltages on the basis of variation of the capacitances of said plurality of variable capacitors with respect to the capacitances of said plurality of fixed capacitors when acceleration is exerted on said weight portion, said calculating means being operative to determine the magnitudes of components of said acceleration from said differential voltages, said components of said acceleration being respectively directed to three axes of an orthogonal system.

7. An acceleration sensor as set forth in claim 6, in which said differential voltage producing means and said calculating means are integrated with said plurality of variable capacitors and said plurality of fixed capacitors.

8. An acceleration sensor as set forth in claim 7, in which one of said movable electrodes and said first stationary electrodes are replaced with a single electrode opposite to the other of said movable electrodes and said first stationary electrodes.

* * * * *

UNITED STATES PATENT AND TRADEMARK OFFICE
CERTIFICATE OF CORRECTION

PATENT NO. : 5,383,364
DATED : January 24, 1995
INVENTOR(S) : Masaji TAKAHASHI, et al.

It is certified that error appears in the above-indentified patent and that said Letters Patent is hereby corrected as shown below:

Col. 3, line 5, delete "2e" and insert -- 2i --.

Col. 3, line 49, delete "2e" and insert --2i --.

Col. 3, line 63, delete "2e" and insert --2i--.

Col. 4, line 54, delete "z" and insert -- Z --

Signed and Sealed this

Third Day of October, 1995

Attest:

BRUCE LEHMAN

Attesting Officer    Commissioner of Patents and Trademarks